Figures 1, 2:
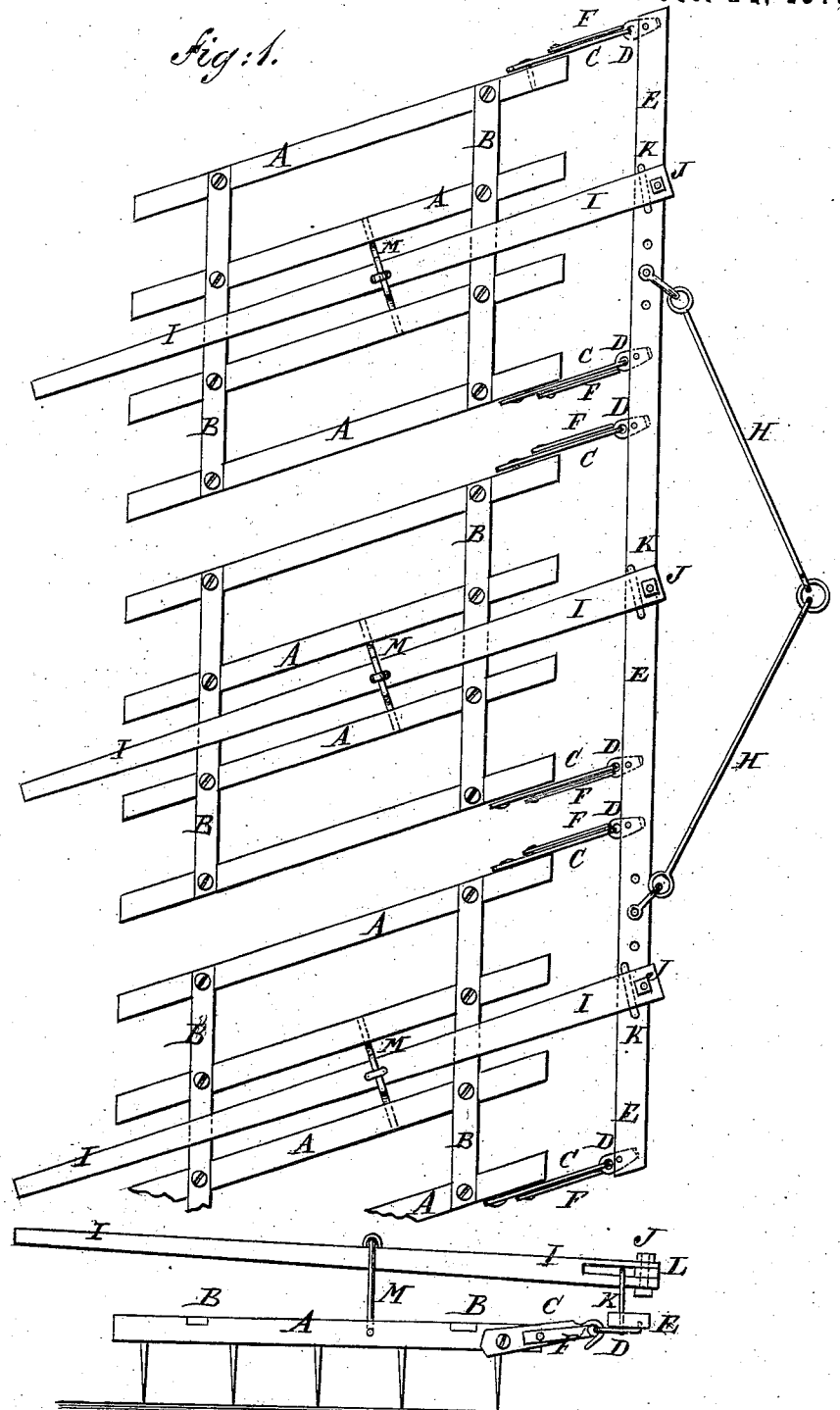

A. W. DAVIS.
HARROW.

No. 183,542. Patented Oct. 24, 1876.

WITNESSES:
Chas. Nida
John Goethals

INVENTOR:
A. W. Davis,
BY [signature]
ATTORNEYS.

UNITED STATES PATENT OFFICE.

ADOLPHUS W. DAVIS, OF DWIGHT, ILLINOIS.

IMPROVEMENT IN HARROWS.

Specification forming part of Letters Patent No. 183,542, dated October 24, 1876; application filed July 22, 1876.

*To all whom it may concern:*

Be it known that I, ADOLPHUS W. DAVIS, of Dwight, in the county of Livingston and State of Illinois, have invented a new and useful Improvement in Harrows, of which the following is a specification:

Figure 1 is a top view of my improved harrow. Fig. 2 is a side view of the same.

Similar letters of reference indicate corresponding parts.

The object of this invention is to improve the construction of the harrow for which Letters Patent No. 165,480 were granted to me July 13, 1875, so as to make it simple in construction and less expensive in manufacture, while being equally effective in operation.

The invention consists in the combination of the hooks, the eye-plates, and the latches with the draft-bar, and with the outer sides of the forward ends of the side bars of the harrow-sections, as hereinafter fully described.

The harrow-frame is made in two or more sections, each of which is formed of four longitudinal bars, A, rigidly connected near their front and rear ends by two cross-bars, B, in such a way that the said sections may be diamond-shaped. To the outer sides of the forward ends of the side bars A of each section are pivoted the rear ends of short bars or plates C, upon the forward ends of which are formed hooks to hook into holes or eyes in the rear ends of plates D, attached to the lower side of the long draft-bar E. The hooks C are locked in place in the holes in the plates D by the latches F, placed upon the outer side of the hooks C, and the rear ends of which are riveted to the rear parts of the said hooks C. The forward parts of the latches F cover the openings of the hooks C, and thus prevent the said hooks from becoming unhooked accidentally. This construction, while keeping the sections in their proper relative positions, allows either of said sections to be raised from the ground vertically, or either end first, and also allows them to be readily disconnected when desired. H are the draft-rods, the forward ends of which are connected by a large ring, $h'$, to which the double-tree clevis is attached. The rear ends of the rods H are connected with the draft-bar E by clevises, several holes being formed in said draft-bar to receive the said clevises, so that the points of draft attachment may be adjusted as required. I are levers, the forward ends of which have long slots sawed in them to receive the bends of the U-standards K, attached to the draft-bar E. The slotted ends of the levers I are strengthened and kept in place upon the standards K by small bolts J, small blocks L being inserted in the open ends of the said slots, to prevent them from being pressed together by tightening up the said bolts J. To the middle parts of the levers I are pivoted the bends of the U-rods M, the ends of the arms of which are bent outward at right angles, and are inserted in holes in the adjacent sides of the middle longitudinal bars of the sections of the harrow-frame. The rear ends of the levers I project in the rear of the harrow-frame, and are about as high from the ground as a man's knee, so that they may be grasped and operated by the driver without his having to stoop so much as to take his eyes from the horses.

By this construction, by pushing one of the levers I forward and then raising its rear end, the forward end of the section will be raised from the ground, and then, as the upward movement of the lever is continued, the whole section will be raised from the ground. In the same way, by drawing the lever to the rearward, and then raising its rear end, the section will be raised rear end first. As either end is raised, the other end rests upon the ground to do its required work.

Having thus described my invention, I claim as new and desire to secure by Letters Patent—

The combination of the hooks C, eye-plates D, and latches F with the draft-bar E, and with the outer sides of the forward ends of the side bars A of the harrow-section, substantially as herein shown and described.

ADOLPHUS W. DAVIS.

Witnesses:
 JOHN F. WHITLOCK,
 JOHN B. CAMPBELL.